(No Model.)
W. A. FRENCH.
INSULATOR AND PROTECTOR FOR UNDERGROUND LINES.
No. 253,029. Patented Jan. 31, 1882.
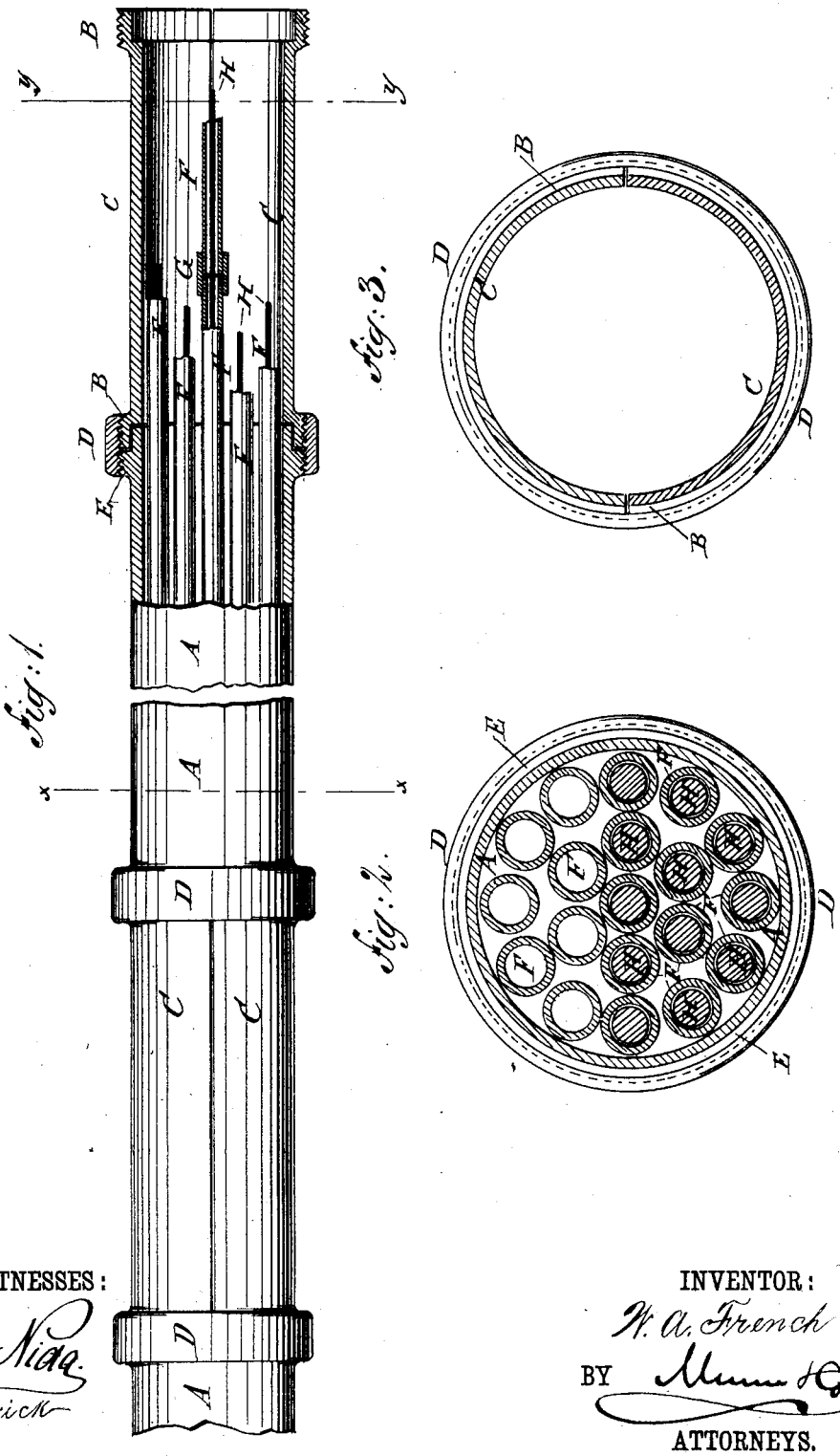
WITNESSES:
Chas Nidd
C. Sedgwick
INVENTOR:
W. A. French
BY Munn &Co
ATTORNEYS.

UNITED STATES PATENT OFFICE.

WILLIAM A. FRENCH, OF CAMDEN, NEW JERSEY.

INSULATOR AND PROTECTOR FOR UNDERGROUND LINES.

SPECIFICATION forming part of Letters Patent No. 253,029, dated January 31, 1882.

Application filed November 19, 1881. (No model.)

*To all whom it may concern:*

Be it known that I, WILLIAM A. FRENCH, of Camden, in the county of Camden and State of New Jersey, have invented a new and useful Improvement in Insulators and Protectors for Underground-Telegraph Wires, of which the following is a full, clear, and exact description.

Reference is to be had to the accompanying drawings, forming a part of this specification, in which similar letters of reference indicate corresponding parts in all the figures.

Figure 1 is a side elevation of my improvement, partly in section. Fig. 2 is a sectional end elevation of the same, taken through the line $x\ x$, Fig. 1. Fig. 3 is a sectional end elevation of the halved exterior connecting-tube, taken through the line $y\ y$, Fig. 1.

The object of this invention is to provide a simple and reliable means for insulating and protecting underground-telegraph wires.

A represents a tube of hard rubber, about ten feet in length and of such a diameter as the number of wires to be used may require. The outer surface of each end of each tube A is rabbeted to receive the end of the connecting-tube C, and has a collar, E, formed around it at the shoulder of the rabbet. The collar E has a screw-thread formed in its surface to receive the screw-thread of the coupling-band D. The connecting-tube C is formed in two parts or halves, and upon each end is formed an offset, B, to receive and fit upon the rabbeted end of the tube A. The offset or collar B fits against the edge of the collar E of the tube A, and has a screw-thread formed upon it to receive the screw-coupling band D. Each tube A is fitted with small tubes F, of soft rubber, of such a size that a telegraph-wire, H, can be easily slipped through each of the said tubes F. The tubes F are made of such a length that their ends will project eighteen inches (more or less) beyond the ends of the tube A. The projections of the soft-rubber tubes F should be such that the ends of the corresponding tubes F of the adjacent tubes A will meet at or near the center of the connecting-tubes C, where they are connected by a short coupling-tube, G, of hard rubber. I prefer to make the connecting-tubes C about three feet long; but they may be made of the same length as the tubes A, or of any other desired length, the projection of the ends of the soft-rubber tubes F being regulated accordingly.

The wires H can be covered with an insulating material, if desired, before being placed in the tubes A C.

In applying the invention to practical use the telegraph-wires H are passed through the soft-rubber tubes F of a number of the hard-rubber tubes A, which are placed at such a distance apart that the ends of the soft-rubber tubes F will meet. The ends of the corresponding tubes F are then connected by the small couplings G. The parts of the connecting-tube C are then applied to the adjacent ends of the hard-rubber tubes A, and the bands D are screwed upon the collars E B, the joints being made tight by cement or some suitable packing. By this construction the wires will be securely insulated, and at the same time effectually protected.

It may be observed that the soft-rubber tubes F can be made of any desired length, and can be inserted in the hard-rubber tubes before or after the said hard-rubber tubes have been put in position, so that the half-section tubes C can be dispensed with in whole or in part.

Having thus described my invention, I claim as new and desire to secure by Letters Patent—

1. The combination, with hard-rubber tubes A, of the interior soft-rubber tubes F, connected by short hard-rubber couplings G, as and for the purpose specified.

2. In a telegraph-wire insulator and protector, the combination of the series of exterior hard-rubber tubes, A, having collars E, and connected by hard-rubber tubes C, made in halves, and provided with collars B, and the coupling-bands D, substantially as herein shown and described, whereby the wires will be securely insulated and effectually protected, as set forth.

WILLIAM A. FRENCH.

Witnesses:
W. E. RUDOLPH,
A. J. PICKERING.